Patented Jan. 12, 1943

2,307,773

UNITED STATES PATENT OFFICE 2,307,773

TREATMENT OF HYDROCARBONS

Gustav Egloff, Chicago, Ill., assignor to Universal Oil Products Company, Chicago, Ill., a corporation of Delaware No Drawing. Application November 18, 1940, Serial No. 366,141

6 Claims. (Cl. 196—10)

This invention relates to the treatment of the lower boiling gaseous and liquid hydrocarbons associated with petroleum, although its principles may also be applied to the treatment of other hydrocarbons of higher molecular weight.

In a more specific sense, the invention is concerned with a process involving a sequence of cooperative steps in which the lower boiling and normally gaseous hydrocarbons including ethane, propane, and the butanes are effectively converted into higher molecular weight hydrocarbons of gasoline boiling range which have superior detonating properties due to their compact molecular structure.

The problem of the utilization of the normally gaseous hydrocarbons associated with petroleum and concurrently produced as by-products in both the non-destructive and destructive distillation of petroleum is one of primary importance since these gases are produced in larger quantities than are necessary if they are to be used directly as fuel and since their conversion into gasoline boiling range hydrocarbons enhances their commercial value to a considerable extent. Extensive research is at present being directed along the lines of more effective utilization of gaseous hydrocarbons, some of the processes involving straight pyrolysis under high temperatures and pressures to produce definite yields of liquid hydrocarbons, other processes employing catalysts in connection with the pyrolysis and some employing a series of reactions involving primarily the dehydrogenation of all or part of the hydrocarbons followed by polymerization or alkylation reactions in the presence of catalysts. The present process is a contribution to the art of producing gasoline boiling range hydrocarbons from normally gaseous compounds by a combination process involving halogenation and alkylation.

In one specific embodiment, the present invention comprises a process for the production of gasoline boiling range paraffin hydrocarbons which consists in fluorinating ethane, propane and/or normal butane to produce corresponding alkyl fluorides and hydrogen fluoride, adding isobutane to the reaction products along with more hydrogen fluoride and/or boron fluoride and subjecting the total mixture to conditions favorable for the alkylation of the added isoparaffin.

In the first step of the present process, it is preferred to form the alkyl fluorides of ethane, propane and/or butane by the direct fluorination of these hydrocarbons although it is comprised within the scope of the invention to form them by other reactions. The reaction of fluorine with the lower molecular weight paraffin hydrocarbons is quite violent under ordinary temperature and pressure conditions and under the influence of light so that for the efficient production of low molecular weight alkyl fluorides by direct fluorination, the reaction is preferably moderated by using relatively low temperatures, sub-atmospheric pressures and diluent gases. Thus for example, ethane may be successfully fluorinated to produce mono and di-fluorides at temperatures of the order of 0° C., subatmospheric pressures of the order of 200 millimeters absolute and in the presence of such diluent gases as nitrogen or carbon dioxide. In such operation, a flowing stream of ethane or of the other normally gaseous paraffins may be cooled to a temperature of approximately 0° C. and mixed with a similarly cooled gas mixture containing fluorine and a diluent gas at a subatmospheric pressure. Obviously to produce high yields of mono-fluorine derivatives, it will be advisable to utilize a considerable molal excess of the hydrocarbon and to employ effective cooling means to prevent incidental rise in temperature.

The reaction of fluorine with paraffin hydrocarbons with the production of hydrogen fluoride which acts as a catalyst in the interaction of the alkyl fluoride with an isoparaffin is exemplified by the following equation:

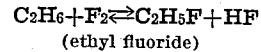
(ethyl fluoride)

It will be seen that as a result of this type of reaction, hydrogen fluoride is produced, which is a known alkylating catalyst for the alkylation of isoparaffin with olefin hydrocarbons. According to the present invention, it has been found that this generated hydrogen fluoride may also be employed as a catalyst for the alkylation of iso-paraffins with alkyl fluorides.

In the second stage of the present process, isoparaffins and particularly isobutane are alkylated by the alkyl fluorides produced in the first step using as catalyst hydrogen fluoride from the first step with or without the addition of boron fluoride as an auxiliary catalyst.

Hydrogen fluoride utilizable as catalyst in the second stage of the process of the present invention is a liquid boiling at about 20° C. and accordingly it can be used in apparatus which is cooled to maintain temperatures below this point or it can be used at higher temperatures if sufficient pressure is maintained upon the apparatus. By maintaining an excess of the added isoparaffin at all times generally up to approximately 20 times the molecular proportion of alkyl fluoride present, there is a relatively high conversion of alkyl fluoride into alkylated paraffinic hydrocarbons. The hydrogen fluoride formed may be employed as alkylating catalyst or it may be utilized in the production of a further quantity of alkyl fluoride to be returned to the process by reaction with olefin hydrocarbons.

In the second stage of the present process, the products from the first stage are preferably maintained at a temperature below 20° C. and added to an excess of isobutane or other isoparaffin. This may be effected as a batch process by charging isoparaffin such as isobutane to a pressure vessel and gradually introducing the products from the primary step of the process. In such cases, it is generally preferable to employ moderate superatmospheric pressure in order to compensate for the vapor pressure of the reactants. These reactions may be effectively brought about by contacting with all reactants in liquid phase. Since hydrogen fluoride boils at 19.4° C. at atmospheric pressure, it will normally exist as a liquid under the preferred alkylation conditions for the second stage of the process.

In the case of continuous operation, the products from the first stage reactions may be mixed with flowing streams of isoparaffins at proper temperature and in suitable proportions maintaining a proper excess of isoparaffin and the reacting substances maintained in contact during passage through tubular reactors which may be designed to effectively maintain proper intimacy of contact by turbulence.

After the second step of the process has been carried out with the production of alkyl derivatives of isoparaffins, the reaction products are subjected to fractionation or any other suitable treatment to separate the alkylated products from unreacted material and recycling of any of the fractions may be practiced such as for example the return of any residual alkyl fluorides back to further contact with isoparaffins and the return of hydrogen fluoride to the second stage wherein it acts as catalyst or is utilized as a means of producing alkyl fluoride from olefins. The first stage of the process normally produces more hydrogen fluoride than is needed for catalytic purposes in the second stage so that in a sense the excess of this material may be considered as a by-product of the process.

The following example is introduced to indicate the type of results normally obtainable in the practical operation of the present process although not with the intention of correspondingly limiting the proper scope of the invention.

Normal butane is reacted with fluorine at a temperature of −10° C. by gradually adding a gas mixture thereto consisting of approximately 5% fluorine and 95% nitrogen to produce approximately 80% yield of mono-fluorbutane. The mixture of this compound and the generated hydrogen fluoride are then added gradually to an excess of isobutane cooled to a temperature of 0° C. and maintained at this temperature during the reaction. The reaction is continued until approximately ¼ of the isobutane has been reacted with the normal butyl fluoride after which period the introduction of the first stage reaction products is stopped and the contents of the reactor are fractionated to recover unreacted materials and a residual hydrocarbon product consisting predominantly of octanes of isomeric character. The unreacted isobutane is further subjected to the reaction of normal butyl fluoride until it is substantially all consumed so that the overall yield of octanes is 80% of the theoretical based on the isobutane charged.

I claim as my invention:

1. A process for converting paraffinic hydrocarbons into higher molecular weight paraffins which comprises fluorinating a paraffin under conditions capable of producing a reaction mixture of alkyl fluoride and hydrogen fluoride, adding an isoparaffin to said mixture and alkylating the same with the alkyl fluoride in the presence of said hydrogen fluoride.

2. A process for producing more valuable products from normally gaseous paraffins which comprises fluorinating the gaseous paraffin under conditions capable of producing a reaction mixture of alkyl fluoride and hydrogen fluoride, adding an isoparaffin to said mixture and alkylating the same with the alkyl fluoride in the presence of said hydrogen fluoride.

3. A process for producing high anti-knock paraffins boiling in the gasoline range which comprises fluorinating a normally gaseous paraffin under conditions capable of forming a reaction mixture of alkyl fluoride and hydrogen fluoride, adding isobutane to said mixture and alkylating the same with the alkyl fluoride in the presence of said hydrogen fluoride.

4. The process as defined in claim 1 further characterized in that boron fluoride is also added to said mixture as additional alkylating catalyst.

5. The process as defined in claim 2 further characterized in that boron fluoride is also added to said mixture as additional alkylating catalyst.

6. The process as defined in claim 3 further characterized in that boron fluoride is also added to said mixture as additional alkylating catalyst.

GUSTAV EGLOFF.